United States Patent
Pedley et al.

(10) Patent No.: US 9,311,668 B2
(45) Date of Patent: Apr. 12, 2016

(54) DETERMINING TO AUDIT A CUSTOMER UTILIZING ANALYTICS

(71) Applicant: Wal-Mart Stores, Inc., Bentonville, AR (US)

(72) Inventors: Douglas James Pedley, Portland, OR (US); Richard Neil Cancro, Portland, OR (US); Joel Bennett Acker, Jr., Brush Prairie, WA (US)

(73) Assignee: WAL-MART STORES, INC., Bentonville, AR (US)

( * ) Notice: Subject to any disclaimer, the term of this patent is extended or adjusted under 35 U.S.C. 154(b) by 481 days.

(21) Appl. No.: 13/754,697

(22) Filed: Jan. 30, 2013

(65) Prior Publication Data

US 2014/0214608 A1    Jul. 31, 2014

(51) Int. Cl.
*G06Q 30/00*    (2012.01)
*G06Q 30/06*    (2012.01)
*G06Q 20/32*    (2012.01)

(52) U.S. Cl.
CPC .......... *G06Q 30/0639* (2013.01); *G06Q 20/322* (2013.01); *G06Q 30/06* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 6,123,259 A * | 9/2000 | Ogasawara | 235/380 |
| 6,659,344 B2 * | 12/2003 | Otto et al. | 235/381 |
| 6,672,506 B2 * | 1/2004 | Swartz et al. | 235/383 |
| 6,837,436 B2 | 1/2005 | Swartz | |
| 7,647,248 B2 * | 1/2010 | Bell et al. | 705/26.8 |
| 7,673,797 B2 | 3/2010 | Edwards | |
| 7,734,513 B2 | 6/2010 | Bonner | |
| 7,845,554 B2 | 12/2010 | Jacobs | |
| 7,908,237 B2 | 3/2011 | Angell | |
| 2007/0008068 A1 * | 1/2007 | Brice et al. | 340/5.91 |
| 2007/0235529 A1 * | 10/2007 | Peters | 235/383 |
| 2013/0166193 A1 * | 6/2013 | Goldman | G01C 21/12 701/410 |

FOREIGN PATENT DOCUMENTS

EP    0903683    3/1999

OTHER PUBLICATIONS

"One third of shoppers admit stealing using self-service tills". The Telegraph. Apr. 26, 2012. Hannah Furness.*
"RFID Data Management: Challenges and Opportunities". Derakhshan, Roozbeh. Orlowska, Maria E. Li, Xu. 2007 iEEE International Conference on RFID. Mar. 26-28, 2007.*
"Retail Shoppability: A measure of the World's Best Stores". Burke, Raymond R. Indian University, Kelly School of Business. Mar. 2005.*

* cited by examiner

*Primary Examiner* — William Allen

(74) *Attorney, Agent, or Firm* — Howard & Howard Attorneys PLLC

(57) ABSTRACT

Embodiments for determining whether the activity of a customer within a retail store violates a business rules are disclosed. The embodiments include a customer performing actions within a retail store via a mobile computing device, generating at least one business rule, and comparing the customer's actions with the business rules.

4 Claims, 6 Drawing Sheets

DETERMINING TO AUDIT A CUSTOMER UTILIZING ANALYTICS

BACKGROUND INFORMATION

1. Field of the Disclosure

The present disclosure relates generally to utilizing analytics in a shopping session. In particular, example embodiments describe techniques for comparing activity of a customer associated with a shopping session with business rules to determine to audit the customer.

2. Background

A customer may visit retail stores, supermarkets, and superstores to shop for items such as clothes, groceries, office supplies, household wares, and/or to purchase services. Typically, a customer may traverse the aisles of the retail store and place items to purchase within a shopping cart. Upon gathering all the items that the customer desires to purchase within a shopping cart, the customer proceeds to a checkout counter to complete the transaction and purchase the items.

With this traditional process, it is difficult to efficiently determine which customers should be audited at the retail stores.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
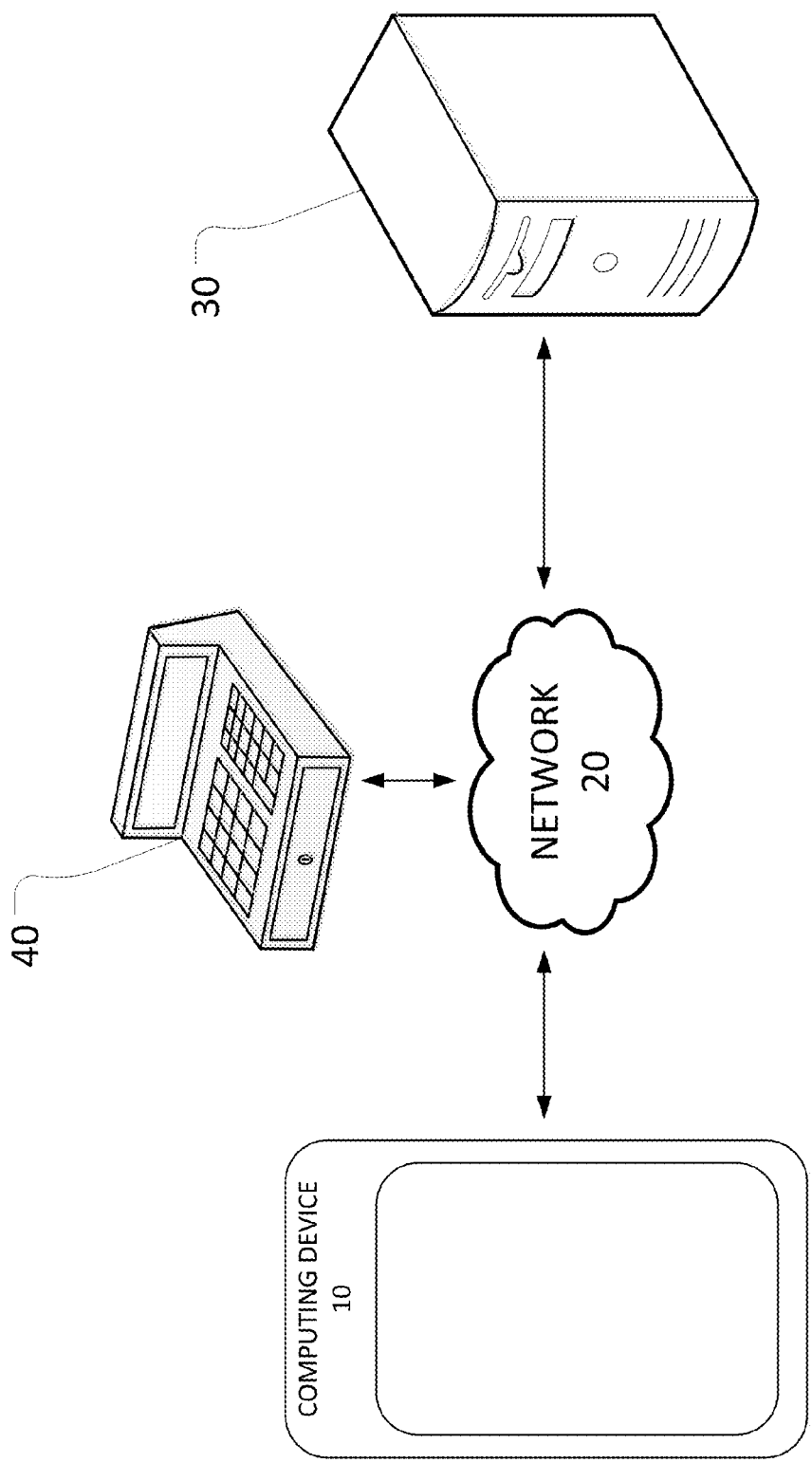
FIG. 1 depicts an example embodiment of a computing device in communication with a point of sale and an audit server via a network.

Corresponding reference characters indicate corresponding components throughout the several views of the drawings. It should be appreciated that elements in the figures are illustrated for simplicity and clarity and have not necessarily been drawn to scale. For example, the dimensions of some of the elements in the figures may be exaggerated relative to other elements to help improve understanding of various embodiments of the present disclosure. Further, common but well-understood elements that are useful or necessary in a commercially feasible embodiment are often not depicted in order to facilitate a less obstructed view of the various embodiments of the present disclosure.

DETAILED DESCRIPTION

In the following description, numerous and specific details are set forth in order to provide a thorough understanding of the present invention. It will be apparent, however, that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it should be appreciated that the figures provided herewith are for explanation purposes that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

The flowchart and block diagrams in the diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Shrinkage or theft of items has been a problem associated within the retail sector. Specifically, shrinkage is a problem with retail stores including a self-checkout point of sale. Embodiments disclosed herein are directed towards retails stores using analytics associated with customers' activities to be more efficient. As used herein, the term "retail store" may refer to any business or a combination of businesses that sell and/or offer to sell products, and/or services to a customer.

While within a retail store, a customer may traverse aisles of the retail store to purchase an item or gain information about an item. As used herein, the term "item" may refer to groceries, foods, office supplies, clothing wares, or other fungible goods sold by the retail store. The customer may scan an identifier associated with the item, such as a bar code, with a mobile computing device to add the item to a shopping list or to receive further information associated with the item. If the customer desires to purchase the item after viewing the further information associated with the item, the customer may add the item to the shopping list. Additionally, if the customer no longer desires to purchase an item on the shopping list, the customer may remove the item from the shopping list via the computing device.

To reduce shrinkage, analytical data may be obtained in response to the customer's activity within the retail store. If the customer desires to complete a transaction for the items on the shopping list, the customer may transmit the shopping list and analytical data, and the customer may visit a point of sale and complete a purchase transaction for the shopping list. The analytical data associated with the customer's activity may be compared with business rules to determine if the customer should be audited upon completing a transaction and/or exiting the retail store. The business rules may be associated with shopping habits or routines of the customer or other customers.

Referring now to FIG. 1, a computing device 10 in communication with an audit server 30 and point of sale (POS) 40 via a network 20 is depicted.

Network 20 may be a wired or wireless network such as the Internet, an intranet, a LAN, a WAN, a cellular network or another type of network. It will be understood that network 20 may be a combination of multiple different kinds of wired or wireless networks.

Computing device 10 may be a smart phone, tablet computer, laptop computer, personal data assistant or any other type of mobile device with a hardware processor that is configured to process instructions and connect to network 20, one or more portions of network 20. Computing device 10 may be configured to obtain data associated with the customer's activity with a retail store. Computing device 10 may be configured to generate data associated with the customer's route within the retail store, generate a shopping list for the customer by scanning an identifier associated with an item, generate data in response to when items were added/removed from the shopping list, generate data in response to if information associated with an item is requested, etc.

Audit server 30 may be a computing device such as a general hardware platform server that is capable of supporting mobile applications, software, and the like executed on computing device 10 or POS 40. Audit server 30 may include physical computing devices residing at a particular location or may be deployed in a cloud computing network environment. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Audit server 30 may include any combination of one or more computer-usable or computer-readable media. For example, audit server 30 may include a computer-readable medium including one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Audit server 30 may be configured to obtain data associated with a customer's activity within a retail store. In embodiments, the customer's activity may be associated with the route the customer takes within the retail store, number of identifiers of items scanned, number of items removed from the shopping list, time between items being added and/or removed from the shopping list, waypoints where items are added and/or removed from the shopping list, types of items within the shopping list, if the customer has scanned identifiers associated with restricted items, etc. The term "restricted item" may refer to an item that is locked, secured, etc., and/or requires assistance of an associate of the retail store to access the item.

Audit server 30 may compare the customer's activity with business rules to determine if the customer should be audited in response to completing a purchase transaction while within the retail store or in response to exiting the retail store. The business rules may be associated with the activities of customers that are likely to steal items, forget to pay for items, or to increase or decrease the shrinkage rate of the retail store, more efficiently manage an inventory of the retail store, etc.

POS 40 may be a computing device including a processor to assist the customer in completing a transaction. POS 40 may be comprised of hardware computing components including a processor, a communication device, graphical user interface, checkout hardware, etc. POS 40 may include a credit card reader, a receipt printer, a cash drawer, a barcode scanner, and/or a personal identification number (PIN) pad with an integrated card swipe. POS 40 may receive a shopping list generated by computing device 10. In response to receiving the shopping list, POS 40 may present receipt information to the customer on the graphical user interface and be configured to receive payment to complete a transaction associated with the shopping list over network 20. POS 40 may transmit data associated with the transaction to audit server 30. In embodiments, the data transmitted associated with the transaction may include the total number of items on the shopping list, an identifier associated with each item scanned such as a name of the item, the number of items scanned for each identifier, the price of each item scanned, etc.

In response to audit server 30 receiving data associated with the transaction from POS 40 and/or the activity of the customer from computing device 10, audit server 30 may determine if the customer should be audited. In embodiments, the customer may be audited to reduce or limit a shrinkage rate associated with the retail store. Audit server 30 may determine an associate of the retail store should audit the customer in response to comparing data associated with the customer's activity and/or data received from POS 40 to business rules.

Figure 2:
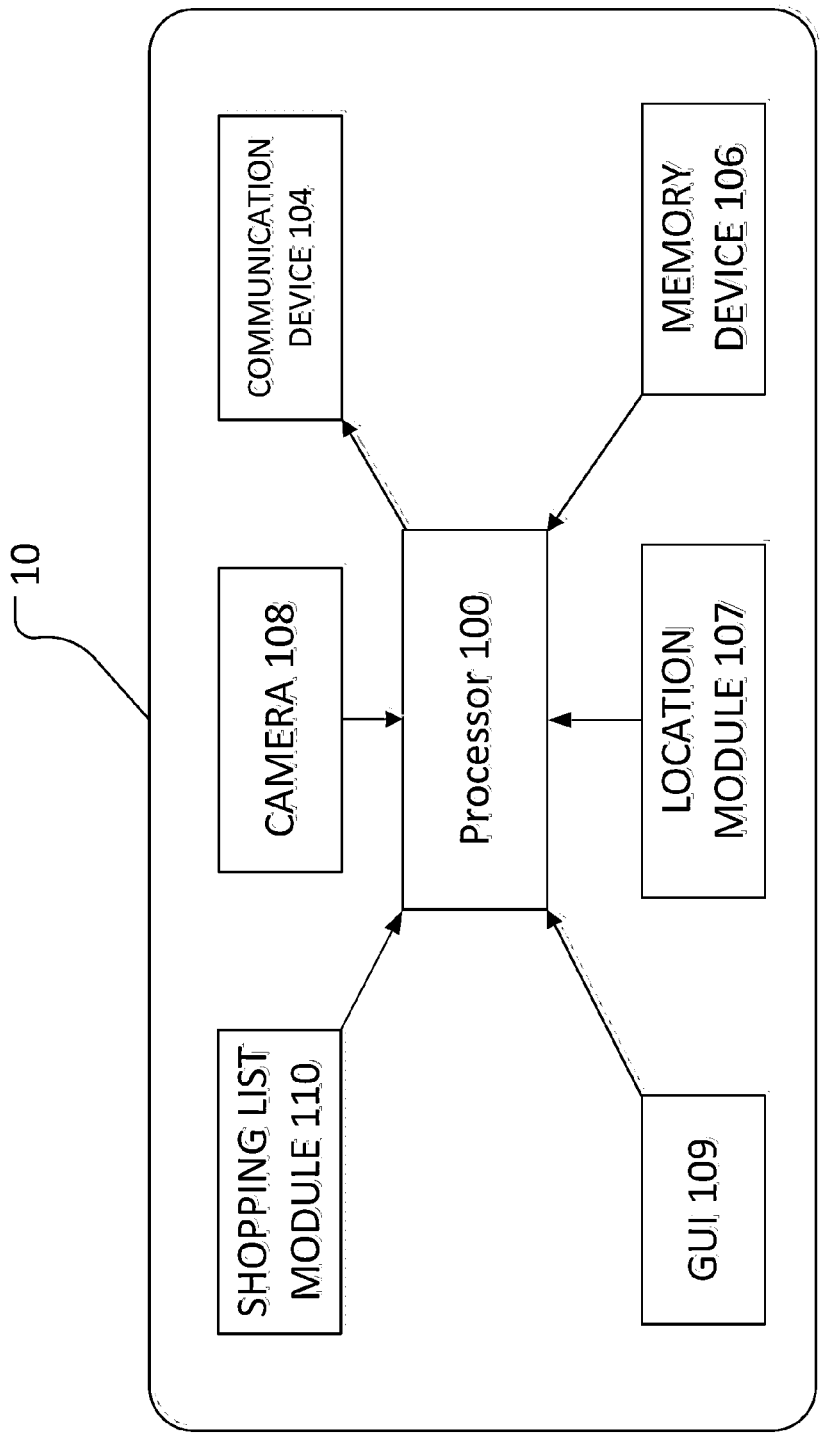
FIG. 2 depicts an example embodiment of components of a computing device.

FIG. 2 depicts an embodiment of a block diagram depicting example components of computing device 10. As shown in the illustrative example, computing device 10 includes a processing device 100, a communication device 104, a memory device 106, location module 107, camera 108, graphical user interface (GUI) 109, and shopping list module 110.

Processing device 100 can include memory, e.g., read only memory (ROM) and random access memory (RAM), storing processor-executable instructions and one or more processors that execute the processor-executable instructions. In embodiments where processing device 100 includes two or more processors, the processors may operate in a parallel or distributed manner. Processing device 100 may execute an operating system of computing device 10 or software associated with other elements of computing device 10.

Communication device 104 is a device that allows computing device 10 to communicate with another device, e.g., audit server 30 and/or POS 40 via network 20. Communication device 104 may include one or more wireless transceivers for performing wireless communication and/or one or more communication ports for performing wired communication.

Memory device 106 is a device that stores data generated or received by computing device 10. Memory device 106 may include, but is not limited to a hard disc drive, an optical disc drive, and/or a flash memory drive.

Location module 107 may be configured to determine a waypoint of computing device 10. Location module 107 may be configured to transmit and/or receive wireless waypoint data such as real-time locating system signals (RTLS), WiFi signals, GPS, Bluetooth, short range radio signals, etc. to determine the waypoint of computing device 10. In embodiments, location module 107 may determine the waypoint of computing device 10 continuously or at intervals if computing device 10 is within the retail store, and/or in response to the customer performing an action on computing device 10, such as scanning an identifier associated with an item.

Camera 108 may be any device that records images that can be stored within memory device 106 or transmitted to another location such as audit server 30 via communication device 104. Camera 108 may be a device that can record still images or videos. In one embodiment, camera 108 may be configured to record images of identifiers such as a bar code, Q-code, an item, or any other identifier associated with an item. As used hereinafter the term "scan" may refer to camera 108 recording an identifier associated with an item.

GUI 109 may be a device that allows a user to interact with computing device 10. While one GUI is shown, the term "user interface" may include, but is not limited to being, a touch screen, a physical keyboard, a mouse, a microphone, and/or a speaker. GUI 109 may include a display configured to present images to the customer on computing device 10, such as a map of the retail store, items on a shopping list, or further information associated with an item. In embodiments, a customer operating computing device 10 may navigate through a retail store and scan identifiers associated with items that the customer desires to purchase or request further information about via camera 108. In response to scanning an identifier associated with the item for further information, GUI 109 may present further information about the item to the customer. GUI 109 may include inputs where the customer may insert or remove items from the shopping list or enter information. GUI 109 may also include inputs where the customer may select and/or enter a desired payment method, such as a credit card, to complete a purchase transaction.

Shopping list module 110 may be embodied as processor-executable instructions stored in the memory of the processing device 100, where processing device 100 can execute shopping list module 110. Shopping list module 110 may be configured to utilize camera device 108 to receive identifiers associated with items that a customer desires to purchase. In embodiments, the identifier associated with the items may be bar codes, Q-codes or any other known type of identifier correlating the item with an entry in a database associated with the item. The identifiers may collectively define a shopping list of items that the customer desires to complete a transaction for. In response to scanning an identifier associated with an item to purchase the item, the item associated with the identifier may be added to the shopping list. In embodiments, GUI 109 may present a quantity field where the customer may enter the quantity of the item that the customer desires to purchase. Therefore, the customer will not have to scan the identifier associated with an item multiple times. In embodiments GUI 109 may present to the consumer a field to obtain further information associated with the item. In response to the customer pressing the field and/or scanning the identifier associated with the item, further information associated with the item may be displayed on GUI 109. The further information may include a name of the item, a price of the item, similar items, and/or items that compliment or are frequently purchased with the scanned item.

In response to computing device 10 scanning an identifier for further information of an item or to add/remove the item on the shopping list, computing device 10 may transmit a name associated with the item, the waypoint of computing device 10 where the identifier was scanned, and/or a time stamp when the waypoint was determined to audit server 30 and/or POS 40 via network 20.

In view of the above, computing device 10 may be configured to track the customer's activity within the retail store. In embodiments, if the customer enters the retail store a plurality of times, each time the customer enters the retail store computing device 10 may track the customer's activity within the retail store, and transmit data associated with the customer's activity to audit server 30 to create a retail store profile for the customer. The retail store profile may be configured to determine if the customer's activity within the retail store is congruent with the customer's previous activity within the retail store and/or in accordance with business rules associated with the retail store.

Figure 3:
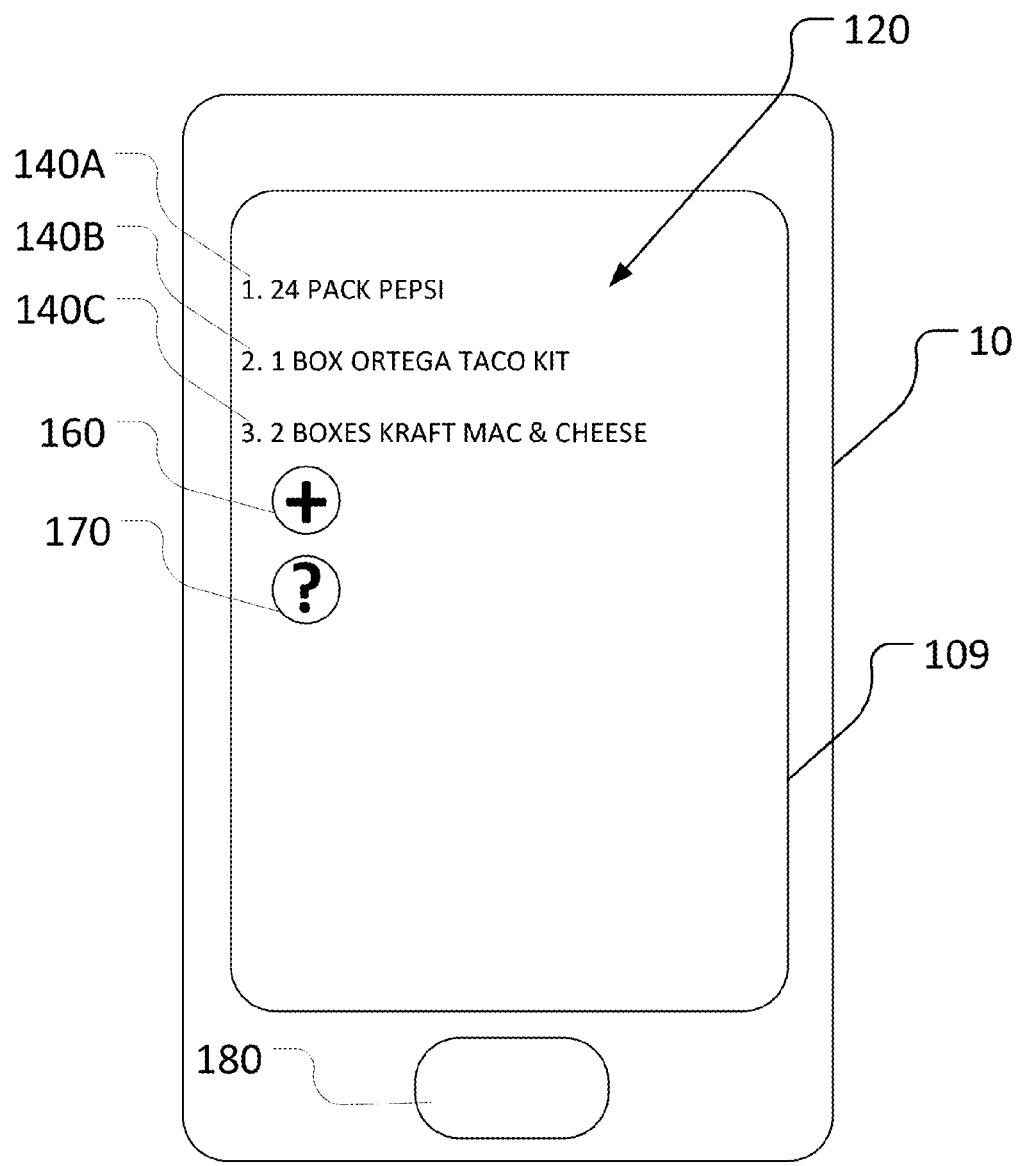
FIG. 3 depicts an example embodiment of a graphical user interface of a computing device.

FIG. 3 depicts a display of a shopping list 120 including items that the customer desires to purchase presented on GUI 109. Shopping list 120 includes items selected by the customer via computing device 10, e.g., item 140A, item 140B, and item 140C. Further, a field 160 allows the customer to scan additional identifiers of items to add an item to shopping list 120. When the customer presses field 160, the customer may add another item by taking a picture of an identifier or by scanning an identifier for an item, by manually entering text of the name of the product, or by any other mechanism identifying the item. In the example, the customer has added a first item 140A indicating a 24 pack of PEPSI®, a second item 140B indicating an ORTEGA® taco kit, and a third item 140C indicating a box of KRAFT MAC & CHEESE® to the shopping list. In response to the customer adding a new item to the shopping list, computing device 10 may determine a waypoint of the customer within the retail store and a time stamp associated with when the waypoint was determined.

Further, a field 170 allows the customer to scan identifiers of an item to request further information associated with the item. When the customer presses field 170, the customer may be presented with the further information by taking a picture of or scanning an identifier of an item, by manually entering text of the name of the product, or by any other mechanism identifying the item. In response to the customer scanning an identifier to receive further information about an item, computing device 10 may determine a waypoint of the customer within the retail store and a time stamp associated with when the waypoint was determined.

In response to computing device 10 scanning an identifier for further information of an item or to add/remove the item on the shopping list, computing device 10 may transmit a name associated with the item, the waypoint of the item, and/or the time stamp when the waypoint was determined to audit server 30 and/or POS 40 via network 20.

If the customer has finished generating the shopping list the customer can press, or otherwise select, button 180. In response to the customer selecting button 180, computing device 10 may transmit a notification including the shopping list 120 and the customer's activity within the retail store to audit server 30.

Figure 4:
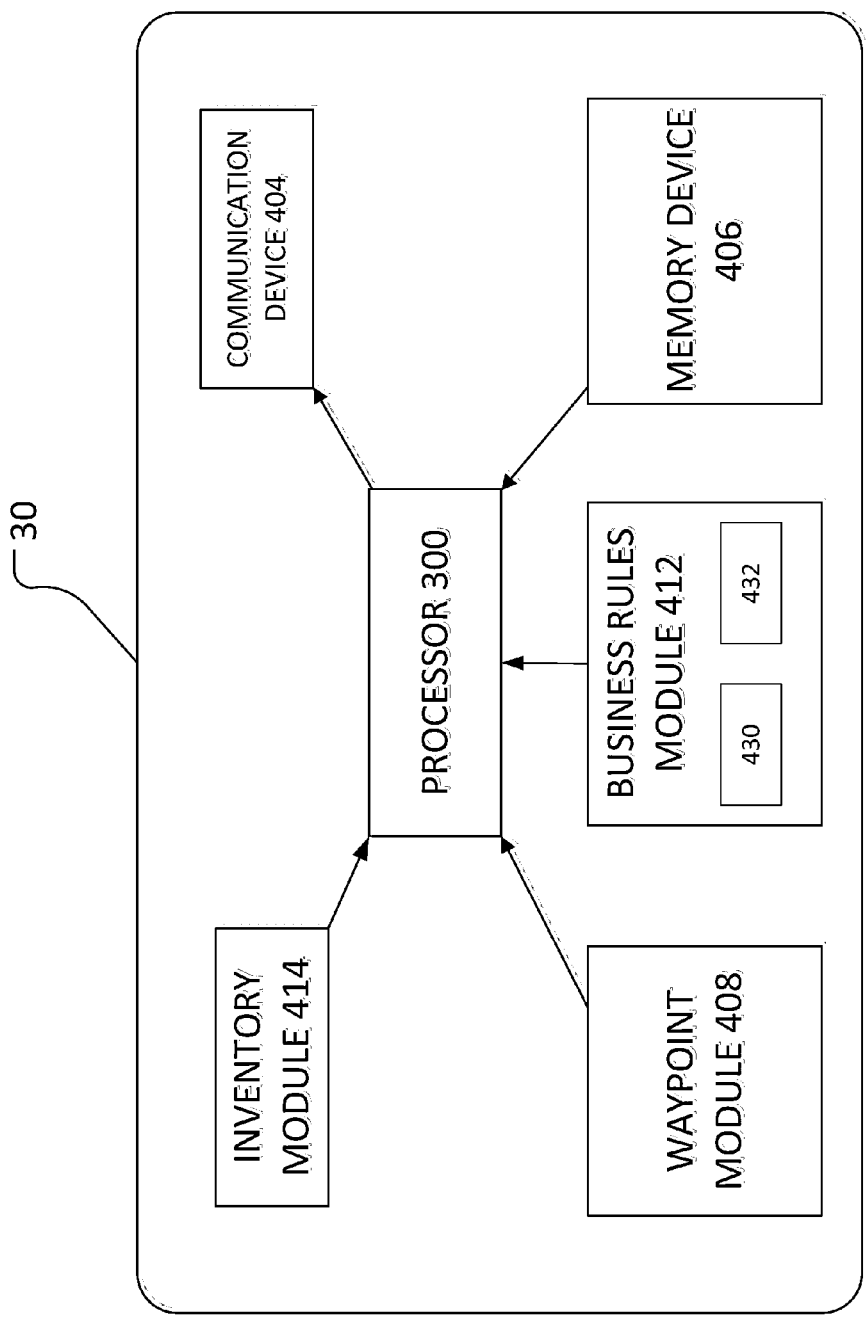
FIG. 4 depicts an example embodiment of example components of an audit server.

FIG. 4 depicts an embodiment of components of audit server 30 may be configured to perform one or more of the requested functions from mobile computing device 10 or POS 40. In the illustrated embodiment, audit server 30 may include a processing device 400, a communication device 404, a memory device 406, a waypoint module 408, a business rules module 412, and an inventory module 414.

Processing device 400 may include memory, e.g., read only memory (ROM) and random access memory (RAM), storing processor-executable instructions and one or more processors that execute the processor-executable instructions. In embodiments where processing device 400 includes two or more processors, the processors may operate in a parallel or distributed manner. In the illustrative embodiment, processing device 400 executes waypoint module 408, business rules module 412 and inventory module 414.

Communication device 404 may be a device that allows audit server 30 to communicate with others device, e.g., the computing device 10 and/or POS 40, via network 20. Communication device 404 may include one or more wireless transceivers for performing wireless communication and/or one or more communication ports for performing wired communication.

Memory device 406 may be a device that stores data generated or received by audit server 30. Memory device 406 may include, but is not limited to being a hard disc drive, an optical disc drive, and/or a flash memory drive. Further, memory device 406 may be distributed and located at multiple locations. Memory device 406 may be accessible to the processing device 400. In embodiments, memory device 406 may be configured to store information associated with waypoint module 408, business rules module 412, and inventory module 414. In one embodiment, memory device 406 may store waypoint data for waypoint module 408 received from computing device 10 indicating the location of the customer or items within the retail store and/or a map of the retail store, business rules for business rules module 412, and identifiers and pricing information associated with items carried by the retail store for inventory module 414. In embodiments, memory device 406 may be configured to store data associated with the customer's activity. Memory device 406 may receive data from computing device 10 via communication device 404 and store the data in a corresponding entry associated with the customer. Each time the customer performs an action within the retail store's website, the customer's activity may be stored within the entry to generate a retail store profile for the customer. The retail store profile for the customer may be used to determine the customer's habits and/or compare the customer's habits to business rules.

Waypoint module 408 may be configured to determine waypoint data identifying a location of computing device 10 and/or items within a retail store. Waypoint module 408 may determine a waypoint of computing device 10 in response to the consumer performing an action within the retail store, such as scanning an identifier. Waypoint data determined via waypoint module 408 may include data identifying the coordinates of computing device 10 and a corresponding time stamp when the action was performed. Waypoint module 408 may determine the waypoint of computing device 10 via any known means, such as a RTLS WiFi, radar, mobile device tracking, time distance of arrival (TDOA) signals, short wave radio, Bluetooth, etc. Waypoint module 408 may perform known triangulation techniques to determine the current waypoint of the computing device 10, items within the retail store, and store data associated with the current waypoint computing device 10 in memory device 406. In one example embodiment, to determine waypoint computing device 10, waypoint module 408 may transmit and receive waypoint signals to transceivers positioned throughout a retail store and/or computing device 10. In response to transmitting waypoint signals to the transceivers, waypoint module 408 may receive waypoint data to determine the current waypoint of computing device 10. In embodiments, waypoint module 408 may be configured to obtain and store maps corresponding to the layout of retail stores. Waypoint module 408 may receive a map of the retail store from a plurality of sources such as the retail store itself, a partner of the retail store, the internet, or any other source of map information. In some embodiments, waypoint module 408 may include maps that comprise a specific layout of a retail store including product placement indicators, the size of different departments, and/or an aisle of the retail store.

Inventory module 414 may be configured to determine an item a customer desires to purchase within the received shopping list in response to the notification received from computing device 10. Inventory module 414 may be configured to map the received identifiers with identifiers for inventory items stored within a database in memory device 406. Inventory module 414 may compare the identifiers to determine which item the identifier corresponds too. Inventory module 414 may also determine a price within the database entry for each item on the shopping list. Once each identifier corresponding to the item on the shopping list and the price of the item is determined, inventory module 414 may generate a receipt for the shopping list. Inventory module 414 may transmit the receipt for the shopping list to POS 40 to complete a transaction associated with the shopping list.

Business rules module 412 may be configured to store business rules associated with policies or conditions that the retail store utilizes to determine to audit a customer exiting the retail store of completing a purchase transaction. Business rules module 412 may include a business rules database 430 and business rules processor 432. Business rules database 430 may include rules associated with the activity of customers that are likely to increase a shrinkage rate of the retail store. Therefore, if s consumer's activity violates a business rule then the consumer may be audited. Example business rules stored within business rules database 432 may include:

a shopping list cost threshold associated with a cumulative cost of the items within the shopping list, a shopping list quantity threshold associated with the cumulative number of items on the shopping list, an item quantity threshold associated with the quantity of any item on the shopping list, an item cost threshold associated with the price of any item on the shopping list, an item type associated with any item on the shopping list that is a restricted item, a waypoint time threshold associated with the amount of time a customer spends at any waypoint, a distance threshold associated with a distance the customer traversed within the retail store, a divergence threshold associated with the distance a customer diverges from previous routes he took within the retail store, wherein the pervious routes associated with the customers may be stored within an entry of a database within memory device 406, a total period threshold associated with the total time that the customer was in the retail store, a time threshold associated with the time a customer enters or exits the retail store, wherein each customer that enters and/or exits the retail store between determined times may be audited, an interval frequency threshold associated with the number of times the customer visited the retail store over an interval, wherein the interval may be any desired period of time such as an hour, day, week, month, year, a visit count associated with the number of times the customer has visited the retail store, a scanned item threshold associated with the number of identifiers the consumer scans for further information in the retail store, a remove threshold associated with the number of items removed from the shopping list, and/or any other metric in response to the customer's activity in the retail store or on the website associated with the retail store.

In embodiments, the above example thresholds and counts may be determined by empirical evidence associated with shrinkage rates of the retail store. The thresholds and counts may be determined by anyone associated with the retail store and may vary based on location, season, etc.

Business rules processor 432 may be configured to compare the activity of the customer within the retail store with the business rules within business rules module 430. In response to comparing the activity of the customer with the business rules, business rules processor 432 may determine if the activity of the customer violates a business rule. For example, in an embodiment, if the customer included more items in the shopping list than the shopping list quantity threshold, then business rules processor 432 may determine that the consumer's activity violates a business rule. If any of the business rules are violated, audit server 30 may transmit a notification to POS 40 or any other computing device associated with the retail store indicating that the customer should be audited. In response to receiving a notification, POS 40 or the other computing device may generate a signal to notify an associate of the retail store that the customer should be audited.

Figure 5:
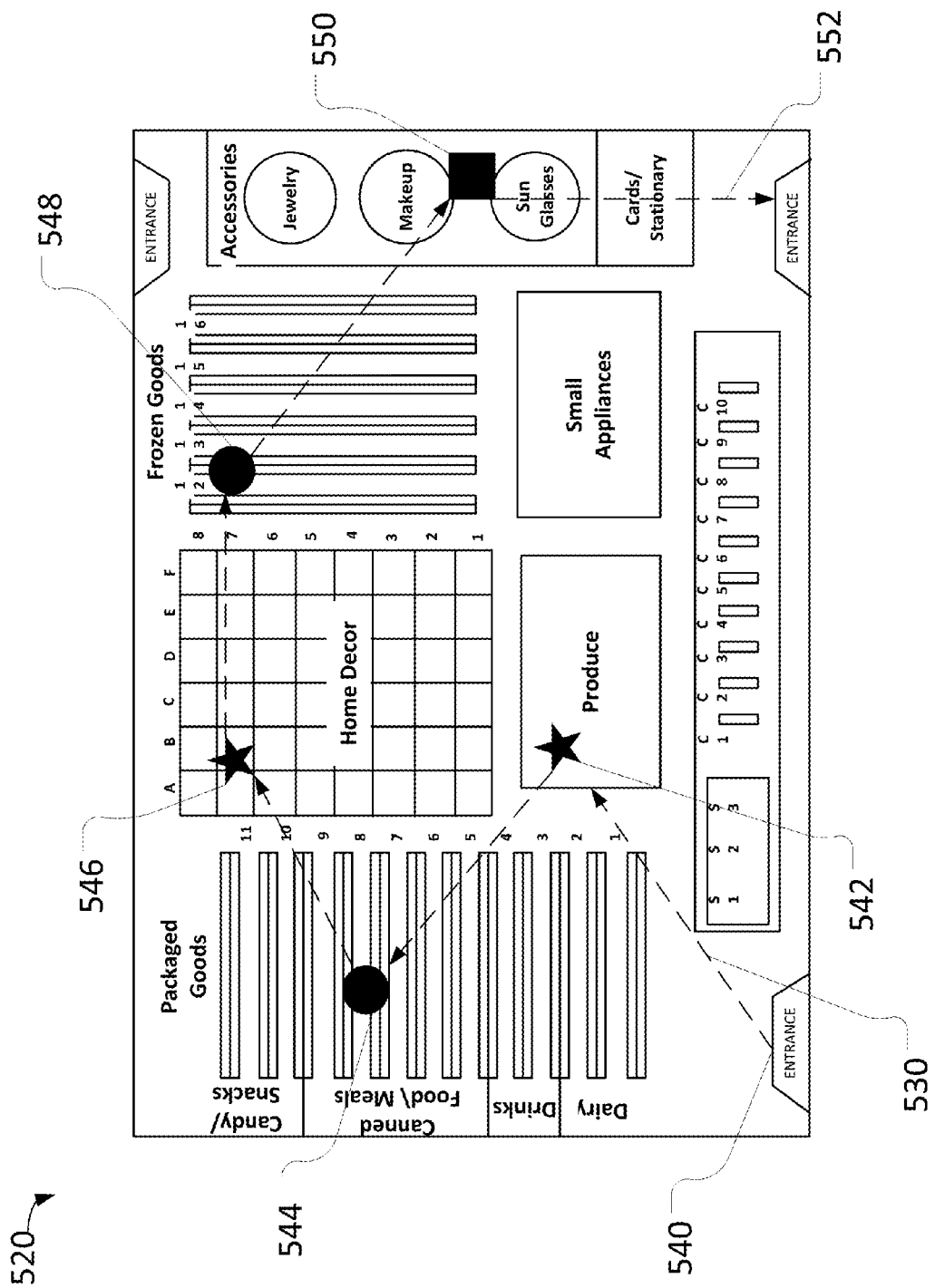
FIG. 5 depicts an example embodiment of the activity of a customer within a retail store.

Referring to FIG. 5, an example of a customer's activity within a retail store is depicted. In one embodiment, the customer's activity within the retail store may utilize map 520 corresponding to the layout of the retail store. It is noted that the example map 520 is provided for example and is not limiting.

Audit server 30 may receive data associated with the customer's activity within the retail store. In one embodiment, the customer takes route 530 within the retail store. In the depicted example, route 530 begins at entrance waypoint 540, and continues through a first waypoint 542, a second waypoint 544, a third waypoint 546, a fourth waypoint 548, a fifth waypoint 550, and ends at exit waypoint 552.

In embodiments, at waypoints 542-550 the customer may perform an action associated with an item within the retail store. At waypoints 542 and 546 the customer may add an item to the shopping list, which may be presented as a star superimposed on map 520. At waypoints 544 and 548, the customer may request further information about an item, which may be identified by a circle superimposed on map 520. At waypoint 550 the customer may remove an item from the shopping list, which may be identified by a square superimposed on map 520.

In response to the customer operating a computing device to scan an identifier for further information of an item or to add/remove the item on the shopping list, the computing device may transmit data associated with the type of action the customer performed at the waypoint, a name associated with the item, the waypoint of the item, and/or a time stamp when the waypoint was determined to audit server 30 and/or POS 40 via network 20. The transmitted data may define the customer's activity within the retail store and may be stored in an entry of a database associated with the customer. The customer's collective entrees within the database may form a profile for the customer defining the customer's activity within the retail store.

Figure 6:
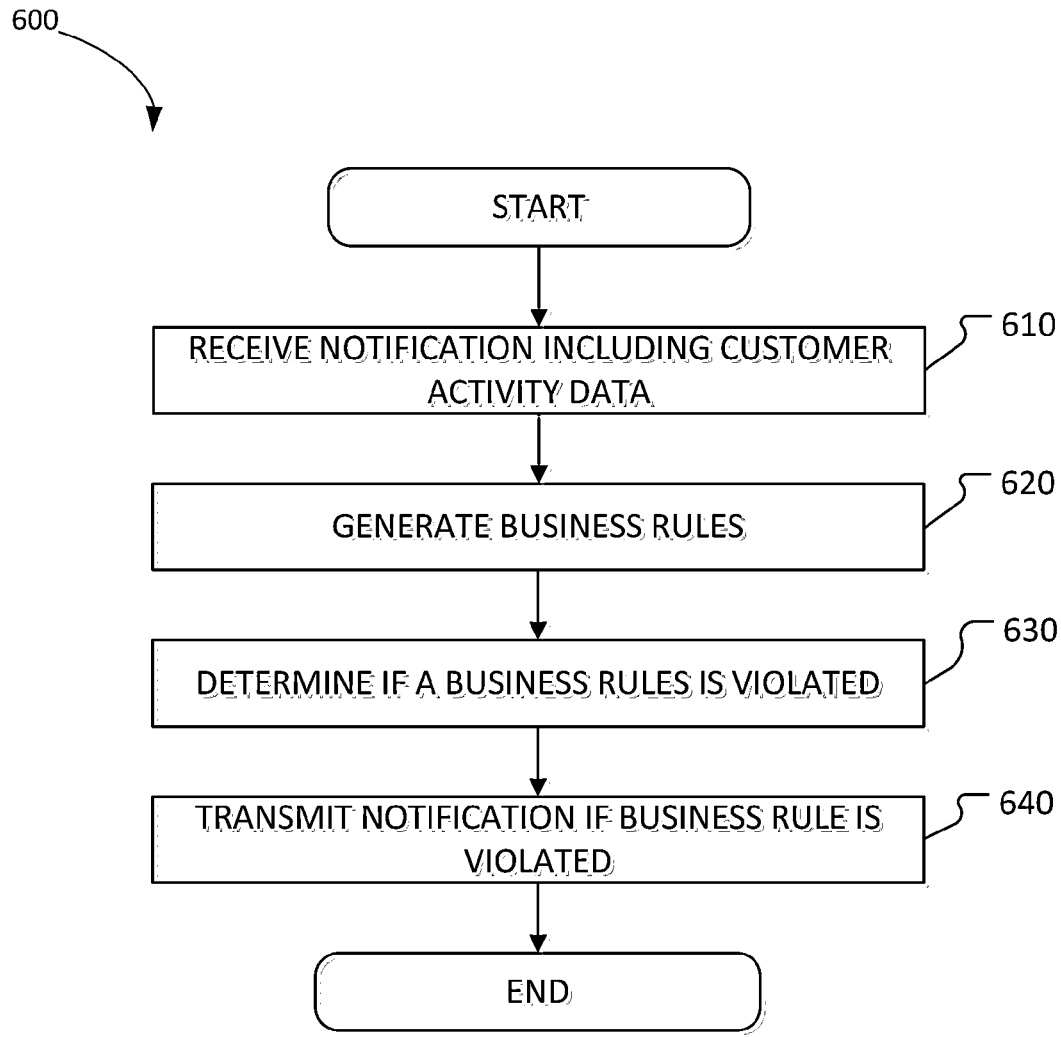
FIG. 6 depicts an example method to determine to audit a customer.

Referring now to FIG. 6, an example method 600 for determining whether to audit a customer utilizing analytics is depicted. In the illustrated example, method 600 is executed by the processing device of audit server 30. It is noted that method 600 may be modified such that it can be executed by processing device 100 of computing device 10. It is further noted that method 600 is presented as a non-limiting example, and in other embodiments steps recited in method 600 may be omitted, rearranged, and/or additional steps may be included.

At operation 610, an audit server may receive a notification of a customer's activity within the retail store. The customer's activity within the retail store may include waypoints where the customer scans an identifier for further information of an item, adds or removes an item on the shopping list, a name associated with the item, the waypoint of the item, and/or a time stamp when the waypoint was determined.

At operation 620, the audit server may generate business rules. The business rules may be associated with activity of customers that are likely to increase a shrinkage rate of the retail store. Example business rules may be associated with a shopping list cost threshold associated with a cumulative cost of the items on the shopping list, a shopping list quantity threshold associated with the cumulative number of items on the shopping list, an item quantity threshold associated with the quantity of an individual item on the shopping list, etc. Thresholds and counts associated with the business rules may be determined by empirical evidence associated with shrinkage rates of the retail store.

At operation 630, the audit server may determine if any business rules were violated. To determine if any business rules were violated, audit server may compare the activity of the customer within the retail store to the business rules. For example, if the customer had included more items in the shopping list than a shopping list quantity threshold then it may be determined that a business rule is violated.

At operation 640, the audit server may transmit a notification to an associate of the retail store if any of the business rules are violated. The notification may include data associated with what business rules were violated and may indicate which customer should be audited.

The above description of illustrated examples of the present disclosure, including what is described in the Abstract, is not intended to be exhaustive or to be limited to the precise forms disclosed. While specific embodiments of, and examples for, the disclosure are described herein for illustrative purposes, various equivalent modifications are possible without departing from the broader spirit and scope of the present disclosure. Indeed, it is appreciated that the specific examples are provided for explanation purposes and that other values may also be employed in other embodiments and examples in accordance with the teachings of the present disclosure.

What is claimed is:

1. A mobile computing comprising:
a software location module configured to determine coordinates of the mobile computing device periodically at predetermined intervals while the customer is within the retail store, wherein, the software location module is configured to determine coordinates of an action completed by a customer in response to activity of a customer within a retail store;
a graphical user interface configured to:
receive the action in response to the activity of the customer within the retail store,
prompt the customer to enter data about the activity into at least one field, and render a superimposed image on a map of the retail store in accordance with the coordinates of the action, the superimposed image indicating a location of the action;

a camera configured to record and transmit one or more identifiers related to the action to an audit server;

a software shopping list module configured to collect and store the one or more identifiers from the camera;

a communication device configured to transmit an action notification including data associated with the activity of the user to the audit server, the data comprising at least the data entered into the graphical user interface by the customer, the coordinates of the mobile computing device collected by the software location module, and the one or more identifiers collected by the software shopping list module; and the mobile computing device further configured to receive, from the audit server, an audit notification when the audit server determines that the activity of the customer within the retail store violates a business rule.

2. The mobile device of claim 1, wherein the action being at least one of scanning an identifier of an item to add the item to a shopping list, removing the item from the shopping list, and scanning the identifier of the item to receive further information associated with the item.

3. The mobile device of claim 1, wherein the determining if the activity of the customer within the retail store violates the business rule includes comparing the activity of the customer within the retail store to the business rule.

4. The mobile device of claim 3, wherein the determining if the activity of the customer within the retail store violates the business rule is determined in response to the customer completing a transaction at the retail store via the graphical user interface.

* * * * *